United States Patent
Numata et al.

(10) Patent No.: US 6,409,985 B1
(45) Date of Patent: Jun. 25, 2002

(54) METHOD FOR PRODUCING LITHIUM MANGANATE

(75) Inventors: Koichi Numata; Hiromu Shinkawa, both of Hiroshima (JP)

(73) Assignee: Mitsui Mining and Smelting Company, Ltd., Tokyo (JP)

( * ) Notice: Subject to any disclaimer, the term of this patent is extended or adjusted under 35 U.S.C. 154(b) by 0 days.

(21) Appl. No.: 09/581,428

(22) PCT Filed: Sep. 6, 1999

(86) PCT No.: PCT/JP99/04811

§ 371 (c)(1),
(2), (4) Date: Jun. 13, 2000

(87) PCT Pub. No.: WO00/32518

PCT Pub. Date: Jun. 8, 2000

(30) Foreign Application Priority Data

Dec. 2, 1998 (JP) .......................... 10-343239

(51) Int. Cl.[7] .......................... C01D 15/00; C01G 45/00
(52) U.S. Cl. ..................................... 423/599
(58) Field of Search .............................. 423/599, 179.5, 423/49; 429/224

(56) References Cited

U.S. PATENT DOCUMENTS

| | | | | |
|---|---|---|---|---|
| 5,766,796 A | * | 6/1998 | Abraham et al. | 429/224 |
| 5,871,863 A | * | 2/1999 | Miyasaka | 429/224 |
| 5,928,714 A | * | 7/1999 | Nunome et al. | 429/224 |
| 6,071,646 A | * | 6/2000 | Noguchi et al. | 429/224 |
| 6,168,888 B1 | * | 1/2001 | Iwata et al. | 423/599 |

FOREIGN PATENT DOCUMENTS

| | | |
|---|---|---|
| JP | 380121 | 4/1991 |
| JP | 3122968 | 5/1991 |
| JP | 05-054886 | 3/1993 |
| JP | 5-174823 | 7/1993 |
| JP | 6-295724 | 10/1994 |
| JP | 797216 | 4/1995 |
| JP | 8-295516 | 11/1996 |
| JP | 9-63583 | 3/1997 |
| JP | 9-213333 | 9/1997 |
| JP | 10172567 | 6/1998 |
| JP | 10-265224 | 10/1998 |
| JP | 11-126607 | 5/1999 |

* cited by examiner

Primary Examiner—Steven Bos
(74) Attorney, Agent, or Firm—Young & Thompson

(57) ABSTRACT

A process for producing lithium manganate, comprising pulverizing electrodeposited manganese dioxide by causing particles of electrodeposited manganese dioxide to collide with each other to produce a pulverized material, screening the pulverized material to an average particle size of 3 to 20 μm thereby to produce a screened material, mixing the screened material with the lithium raw material to form a mixture, and firing the mixture to produce lithium manganate. During screening, electrolytic manganese dioxide having an average particle size smaller than 3 μm is removed from the screened material.

2 Claims, 1 Drawing Sheet

METHOD FOR PRODUCING LITHIUM MANGANATE

TECHNICAL FIELD

The present invention relates to a process of producing lithium manganate. More particularly it relates to a process of lithium manganate production which hardly causes particles to be sintered during firing, reduces iron incorporation, and provides lithium manganate exhibiting satisfactory battery characteristics when used as a cathode material of a nonaqueous secondary battery.

BACKGROUND ART

With the recent rapid development of portable and wireless electronic equipment such as personal computers and telephones, the demand for secondary batteries as a driving power source has been increasing. In particular nonaqueous secondary batteries are expected for their smallest size and high energy density. Cathode materials for nonaqueous secondary batteries meeting the demand include lithium cobaltate ($LiCoO_2$), lithium nickelate ($LiNiO_2$), lithium manganate ($LiMn_2O_4$), etc. Having an electrode potential of 4 V or higher with respect to lithium, these complex oxides are capable of providing batteries having a high energy density.

Of the above-described complex oxides, $LiCoO_2$ and $LiNiO_2$ have a theoretical capacity of about 280 mAh/g, while $LiMn_2O_4$ has a theoretical capacity as low as 148 mAh/g but is deemed suited for use in electric vehicles and the like because of an abundant and inexpensive supply of manganese oxide as a raw material and freedom from such thermal instability in charging as observed with $LiNiO_2$.

Electrolytic manganese dioxide is a suitable manganese source of lithium manganate ($LiMn_2O_4$) for its inexpensiveness and abundance. Electrodeposited manganese dioxide is usually crushed and neutralized for use as a manganese raw material.

The crushed and neutralized electrolytic manganese dioxide has an average particle size of about 20 to 40 $\mu$m. It should be pulverized to an average size of about 5 $\mu$m which is suitable as a manganese raw material. However, the electrolytic manganese dioxide obtained by conventional pulverization has an average particle size of about 10 $\mu$m. Where lithium manganate prepared from such electrolytic manganese dioxide is used as a cathode material for non-aqueous secondary batteries, there arise problems that the coating properties are poor, and high-rate characteristics are impaired. Moreover, there is another problem that impurities such as iron may be incorporated into the electrolytic manganese dioxide, which adversely affects the properties of lithium manganate.

The pulverization is accompanied by generation of fine particles of the electrolytic manganese dioxide, which, if used as a manganese raw material, tends to accelerate sintering among particles while fired with a lithium raw material.

Accordingly, it is an object of the present invention to provide a process for producing lithium manganate, which hardly causes particles to be sintered during firing, reduces iron incorporation, and provides lithium manganate exhibiting satisfactory battery characteristics when used as a cathode material of a nonaqueous secondary battery.

DISCLOSURE OF THE INVENTION

As a result of studies, the present inventors have found that the above object is accomplished by pulverizing electrolytic manganese dioxide in a pulverizer of the system in which particles are made to collide with each other into particles of about 5 $\mu$m as a raw material of lithium manganate and recovering fine particles by-produced in the pulverization.

The present invention has been completed based on the above finding and provides a process of producing lithium manganate which is characterized by comprising pulverizing electrodeposited manganese dioxide having been crushed and neutralized in a pulverizer of the system in which particles are made to collide with each other, screening the grinds, mixing the resulting electrolytic manganese dioxide having an average particle size of 3 to 20 $\mu$m with a lithium raw material, and firing the mixture.

BEST MODE FOR CARRYING OUT THE INVENTION

Figure 1:
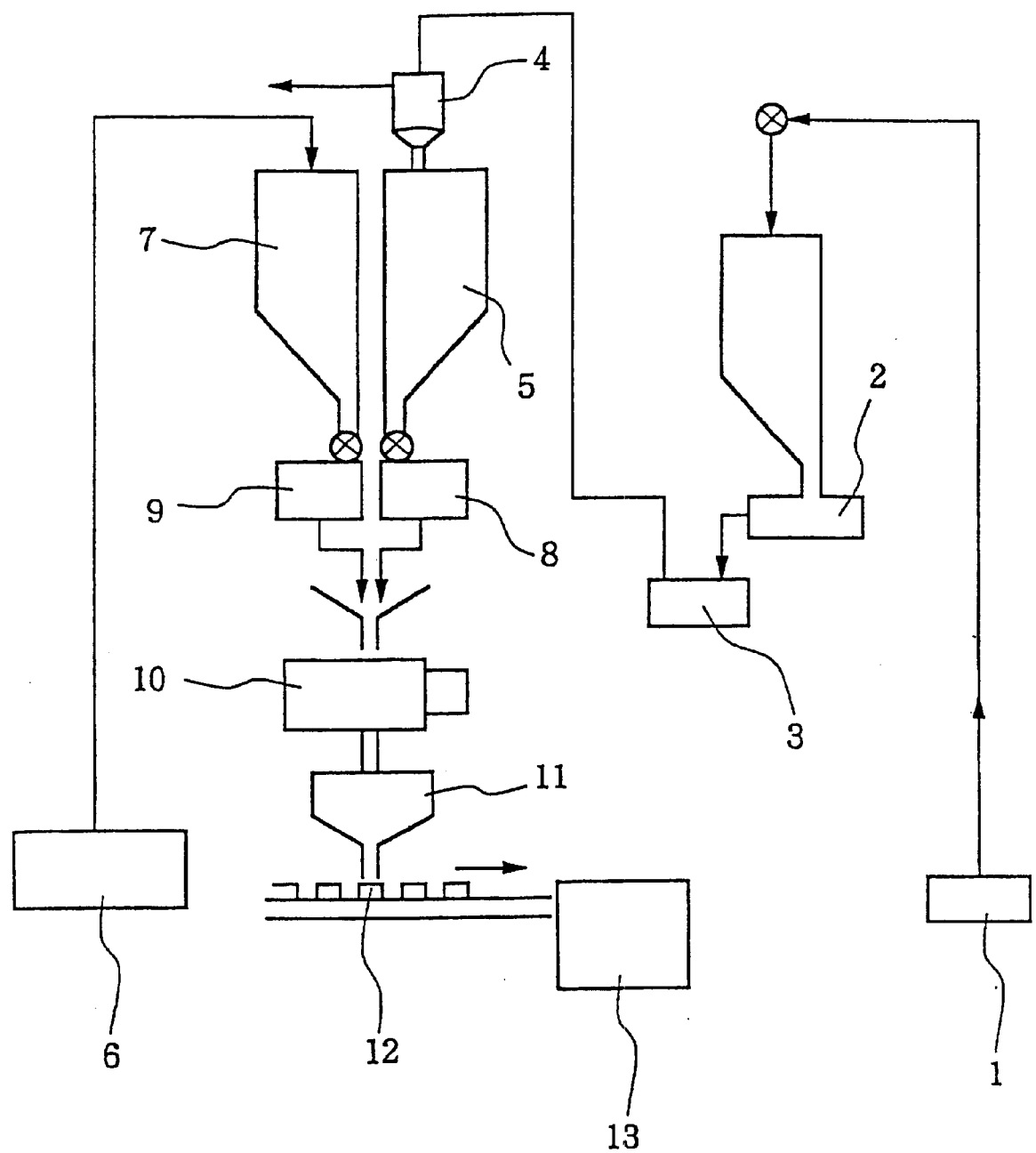
FIG. 1 schematically illustrates an embodiment of the production process according to the present invention.

The production process of the present invention will be described in detail with reference to the drawing. FIG. 1 is a schematic illustration showing an embodiment of the process according to the invention, wherein numeral 1 is an electrolytic manganese dioxide tank; 2, a constant powder feeder; 3, a pulverizer (a pulverizer of the system to make particles collide with each other); 4, a screen classifier; 5, a raw material tank (A); 6, a lithium raw material; 7, a raw material tank (B); 8, a metering tank (A); 9, a metering tank (B); 10, a mixer; 11, a hopper; 12, a firing container; and 13, a firing furnace.

The electrolytic manganese dioxide which is a manganese raw material of lithium manganate is produced electrolytically in the electrolytic cell. Electrolysis is carried out by, for example, using a manganese sulfate solution having a prescribed concentration as an electrolytic solution, a carbon plate as a cathode, and a titanium plate as an anode. Electrolysis is conducted at a constant current density while heating to electrodeposit manganese dioxide on the anode. The electrodeposited manganese dioxide is peeled off the anode, crushed, and neutralized with sodium hydroxide, etc. The crushed and neutralized electrolytic manganese dioxide has an average particle size of about 20 to 40 $\mu$m.

As shown in FIG. 1, the electrolytic manganese dioxide having an average particle size of 20 to 40 $\mu$m that is stored in the electrolytic manganese dioxide tank 1 is fed to the pulverizer 3 through the constant powder feeder 2 and pulverized in the pulverizer 3. The pulverizer 3 used in the invention is of the system in which particles are made to collide with each other. PJM SYSTEM JET MILL, manufactured by Nippon Pneumatic Kogyo K.K., can be mentioned as an example. By use of such a pulverizer, the average particle size of the electrolytic manganese dioxide is reduced to 20 $\mu$m or smaller.

The electrolytic manganese dioxide obtained by pulverizing by means of conventionally employed mills has an average particle size of about 15 $\mu$m. Where such electrolytic manganese dioxide is used as manganese source of lithium manganate, the resulting lithium manganate is, when used as a cathode material of nonaqueous secondary batteries, liable to have poor coating properties and to impair the high-rate characteristics. In addition, there arises another problem that iron may be incorporated into the electrolytic manganese dioxide, which adversely affects the properties of lithium manganate. Where the above-described pulverizer of the system in which particles are made to collide with each other is used, the problem of iron incorporation into electrolytic manganese dioxide does not occur.

The electrolytic manganese dioxide having been pulverized in the pulverizer 3 of the system in which particles are made to collide with each other is sent to the screen classifier 4, where it is screened. The screened electrolytic manganese dioxide having an average particle size of 3 to 20 $\mu$m, e.g., 5 $\mu$m, is reserved in the raw material tank (A).

On the other hand, the undersize electrolytic manganese dioxide having an average particle size smaller than 3 $\mu$m is discharged out of the system and recovered by means of a cyclone, etc. for another use. The electrolytic manganese dioxide whose average particle size is smaller than 3 $\mu$m is produced through pulverization in a proportion of about 5 to 20% by weight based on the total weight of the electrolytic manganese dioxide. In the present invention, since such fine particles of electrolytic manganese dioxide are not used as a manganese raw material for lithium manganate, sintering among particles which would be caused by such fine particles on firing can be prevented.

The lithium raw material 6 to be used includes lithium carbonate ($Li_2CO_3$), lithium nitrate ($LiNO_3$), and lithium hydroxide (LiOH). Lithium carbonate is particularly preferred. The lithium raw material is reserved in the raw material tank (B) 7.

Prescribed amounts of the electrolytic manganese dioxide reserved in the raw material tank (A) 5 and the lithium raw material, such as lithium carbonate, reserved in the raw material tank (B) 6 are weighed out in the metering tank (A) 8 and the metering tank (B) 9, respectively, and mixed together in the mixer 10. The molar ratio of Li in the lithium raw material to Mn in the electrolytic manganese dioxide, Li/Mn, is preferably 0.50 to 0.60.

The mixed raw material from the mixer 10 is packed into the firing container 12 through the hopper 11. The mixed raw material can be used either as such or after being granulated. Granulation can be carried out in either a wet system or a dry system. Methods of granulation include piston granulation, tumbling granulation, fluidized bed granulation, mixing granulation, spray drying, pressure forming granulation, and flaking granulation using a roll, etc.

The mixed raw material packed in the firing container 12 is put in the firing furnace 13 and fired at 600 to 1000° C., preferably 750 to 1000° C., to obtain lithium manganate, for example, spinel-type lithium manganate. The firing furnaces which can be used include a pusher-type kiln, a roller hearth kiln, a rotary kiln, and a stationary furnace. The firing time is 1 hour or longer, preferably 5 to 20 hours. During the firing the above-mentioned sintering among particles, which is attributed to fine manganese dioxide particles, hardly takes place.

In this manner, lithium manganate can be obtained. The resulting lithium manganate suffers little incorporation of iron as stated above. The lithium manganate thus obtained has satisfactory coating properties and is fit for use as a cathode material of nonaqueous secondary batteries.

In the nonaqueous secondary battery of the present invention, the above-described cathode material is mixed with a conductive material, such as carbon black, and a binder, such as Teflon binder, to prepare a cathode active material mixture. For the anode, lithium or a material capable of intercalating and disintercalating lithium, such as carbon, is used. While not limiting, nonaqueous electrolytes which can be used include a lithium salt, e.g., lithium hexafluorophosphate ($LiPF_6$), dissolved in a mixed solvent, such as ethylene carbonate/dimethyl carbonate.

The nonaqueous secondary battery according to the present invention exhibits improved battery characteristics, such as high-rate characteristics.

Industrial Applicability

According to the production process of the present invention, sintering of particles hardly occurs during firing, incorporation of iron is inhibited, and lithium manganate exhibiting satisfactory battery characteristics when used as a cathode material of a nonaqueous secondary battery can be obtained.

What is claimed is:

1. A process for producing lithium manganate, comprising pulverizing electrodeposited manganese dioxide by causing particles of electrodeposited manganese dioxide to collide with each other to produce a pulverized material, screening the pulverized material to an average particle size of 3 to 20 $\mu$m thereby to produce a screened material, mixing said screened material with a lithium raw material to form a mixture, and firing the mixture to produce lithium manganate, wherein during screening, electrolytic manganese dioxide having an average particle size smaller than 3 $\mu$m is removed from the screened material.

2. A process as claimed in claim 1, wherein said firing is carried out at a temperature of at least 750° C.

* * * * *